(12) United States Patent
Fox et al.

(10) Patent No.: US 11,529,580 B2
(45) Date of Patent: Dec. 20, 2022

(54) SYSTEMS AND METHODS FOR PREDICTING HVAC FILTER CHANGE

(71) Applicant: 3M INNOVATIVE PROPERTIES COMPANY, St. Paul, MN (US)

(72) Inventors: Andrew R. Fox, Oakdale, MN (US); Eric C. Lobner, Woodbury, MN (US); Theresa M. Meyer, Osceola, WI (US); Brian J. Stankiewicz, Mahtomedi, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 17/538,707

(22) Filed: Nov. 30, 2021

(65) Prior Publication Data

US 2022/0088524 A1 Mar. 24, 2022

Related U.S. Application Data (63) Continuation of application No. 17/321,094, filed on May 14, 2021, now Pat. No. 11,241,646, which is a
(Continued)

(51) Int. Cl.
*B01D 46/00* (2022.01)
*F24F 11/39* (2018.01)
(Continued)

(52) U.S. Cl.
CPC .......... *B01D 46/0086* (2013.01); *F24F 11/00* (2013.01); *F24F 11/30* (2018.01);
(Continued)

(58) Field of Classification Search
None
See application file for complete search history.

(56) References Cited

U.S. PATENT DOCUMENTS

| 6,319,114 B1 | 11/2001 | Nair |
| 6,448,896 B1 | 9/2002 | Bankus |

(Continued)

FOREIGN PATENT DOCUMENTS

| CN | 101618286 A | 1/2010 |
| CN | 102764549 A | 11/2012 |

(Continued)

OTHER PUBLICATIONS

Butler, "Prognostic Algorithms for Condition Monitoring and Remaining Useful Life Estimation", National University of Ireland, 2012, pp. 1-271.

(Continued)

*Primary Examiner* — Lina M Cordero
(74) *Attorney, Agent, or Firm* — Kenneth B. Wood (57) ABSTRACT

Computer-implemented systems and methods for estimating a replacement status of an HVAC air filter. Outdoor weather data (e.g., outdoor temperature information), is obtained. A Total Runtime Value of the HVAC system is determined based upon the obtained outdoor weather data. Finally, a replacement status of the air filter is estimated as a function of a comparison of the Total Runtime Value with a Baseline Value. By correlating air filter replacement status with an estimated runtime of the HVAC system, a credible predictor of air filter usage is provided. By estimating fan runtime based on easily-obtained outdoor weather data, the methods are readily implemented with any existing HVAC system and do not require installation of sensors or other mechanical or electrical components to the HVAC system.

21 Claims, 7 Drawing Sheets

Related U.S. Application Data continuation of application No. 16/994,114, filed on Aug. 14, 2020, now Pat. No. 11,040,301, which is a continuation of application No. 16/790,185, filed on Feb. 13, 2020, now Pat. No. 10,773,200, which is a continuation of application No. 15/532,186, filed as application No. PCT/US2015/062591 on Nov. 25, 2015, now Pat. No. 10,610,818.

(60) Provisional application No. 62/085,939, filed on Dec. 1, 2014.

(51) Int. Cl.
| | |
|---|---|
| *F24F 11/00* | (2018.01) |
| *F24F 11/30* | (2018.01) |
| *F24F 130/10* | (2018.01) |
| *F24F 130/00* | (2018.01) |
| *F24F 11/63* | (2018.01) |
| *F24F 110/50* | (2018.01) |
| *F24F 110/52* | (2018.01) |

(52) U.S. Cl.
CPC .......... *F24F 11/39* (2018.01); *B01D 2279/50* (2013.01); *F24F 11/63* (2018.01); *F24F 2110/50* (2018.01); *F24F 2110/52* (2018.01); *F24F 2130/00* (2018.01); *F24F 2130/10* (2018.01)

(56) References Cited

U.S. PATENT DOCUMENTS

| | | | |
|---|---|---|---|
| 6,507,282 | B1 | 1/2003 | Sherwood |
| 6,660,070 | B2 * | 12/2003 | Chung ............... B01D 46/0086 |
| | | | 96/417 |
| 6,993,414 | B2 | 1/2006 | Shah |
| 7,261,762 | B2 | 8/2007 | Kang |
| 7,621,978 | B2 | 11/2009 | Johansson |
| 7,640,077 | B2 | 12/2009 | Shah |
| 7,860,662 | B2 | 12/2010 | Parham |
| 7,887,614 | B2 | 2/2011 | Yamazaki |
| 8,097,067 | B2 | 1/2012 | Fox |
| 8,249,731 | B2 | 8/2012 | Tran |
| 8,313,567 | B2 | 11/2012 | Sullivan |
| 8,487,776 | B2 | 7/2013 | Livchak |
| 8,532,808 | B2 | 9/2013 | Drees |
| 8,532,839 | B2 | 9/2013 | Drees |
| 8,534,123 | B2 | 9/2013 | Herman |
| 8,574,343 | B2 | 11/2013 | Bisson |
| 8,600,556 | B2 | 12/2013 | Nesler |
| 8,613,792 | B2 | 12/2013 | Ragland |
| 8,620,597 | B2 | 12/2013 | Nevin |
| 8,623,117 | B2 | 1/2014 | Zavodny |
| 8,657,906 | B2 | 2/2014 | Sullivan |
| 8,657,936 | B2 | 2/2014 | Sullivan |
| 8,704,672 | B2 | 4/2014 | Hoglund |
| 9,125,245 | B2 | 9/2015 | Armstrong |
| 2001/0045159 | A1 | 11/2001 | Johnson |
| 2002/0062221 | A1 | 5/2002 | Seibert |
| 2002/0078830 | A1 * | 6/2002 | Chung ................ B01D 46/46 |
| | | | 96/424 |
| 2003/0070544 | A1 | 4/2003 | Mulvaney |
| 2003/0226809 | A1 | 12/2003 | Zagone |
| 2004/0035125 | A1 | 2/2004 | Ishida |
| 2004/0217872 | A1 | 11/2004 | Bhardwaj |
| 2005/0043858 | A1 | 2/2005 | Gelman |
| 2005/0150382 | A1 | 7/2005 | Sheehan |
| 2005/0154495 | A1 | 7/2005 | Shah |
| 2005/0247194 | A1 | 11/2005 | Kang |
| 2006/0058924 | A1 | 3/2006 | Shah |
| 2006/0130497 | A1 | 6/2006 | Kang |
| 2006/0186214 | A1 | 8/2006 | Simon |
| 2006/0196953 | A1 | 9/2006 | Simon |
| 2007/0058133 | A1 | 3/2007 | Totani |
| 2007/0058373 | A1 | 3/2007 | Yoshimura |
| 2007/0064198 | A1 | 3/2007 | Yoshimura |
| 2007/0144354 | A1 | 6/2007 | Muller |
| 2007/0277672 | A1 | 12/2007 | Johansson |
| 2008/0156195 | A1 | 7/2008 | Yamazaki |
| 2009/0099699 | A1 | 4/2009 | Steinberg |
| 2010/0153023 | A1 | 6/2010 | Parham |
| 2010/0225477 | A1 | 9/2010 | Livchak |
| 2010/0282076 | A1 | 11/2010 | Fox |
| 2010/0324962 | A1 | 12/2010 | Nesler |
| 2011/0047418 | A1 | 2/2011 | Drees |
| 2011/0061015 | A1 | 3/2011 | Drees |
| 2011/0061527 | A1 | 3/2011 | Sullivan |
| 2011/0061537 | A1 | 3/2011 | Sullivan |
| 2011/0077758 | A1 | 3/2011 | Tran |
| 2011/0130886 | A1 | 6/2011 | Drees |
| 2011/0178977 | A1 | 7/2011 | Drees |
| 2011/0295524 | A1 | 12/2011 | Tada |
| 2011/0307160 | A1 | 12/2011 | Verdegan |
| 2011/0308308 | A1 | 12/2011 | Herman |
| 2012/0071077 | A1 | 3/2012 | Mahler |
| 2012/0084018 | A1 | 4/2012 | Nevin |
| 2012/0125592 | A1 * | 5/2012 | Fadell ................ B01D 46/0086 |
| | | | 96/417 |
| 2012/0259469 | A1 | 10/2012 | Ward |
| 2012/0318073 | A1 | 12/2012 | Zavodny |
| 2012/0318137 | A1 | 12/2012 | Ragland |
| 2012/0318138 | A1 | 12/2012 | Bisson |
| 2012/0319851 | A1 | 12/2012 | Hoglund |
| 2012/0323374 | A1 | 12/2012 | Dean-Hendricks |
| 2012/0323375 | A1 | 12/2012 | Dean-Hendricks |
| 2012/0323377 | A1 | 12/2012 | Hoglund |
| 2013/0068099 | A1 | 3/2013 | Sullivan |
| 2013/0227462 | A1 | 8/2013 | Hsu |
| 2013/0262662 | A1 | 10/2013 | McCarthy |
| 2013/0271748 | A1 | 10/2013 | Livchak |
| 2013/0307702 | A1 | 11/2013 | Pal |
| 2014/0040012 | A1 | 2/2014 | Brooks |
| 2014/0067271 | A1 | 3/2014 | Bai |
| 2014/0074730 | A1 | 3/2014 | Arensmeier |
| 2014/0133097 | A1 | 5/2014 | Kuramitsu |
| 2014/0190240 | A1 | 7/2014 | He |
| 2014/0249848 | A1 | 9/2014 | Averill |
| 2014/0297646 | A1 | 10/2014 | Bastiaens |
| 2015/0254958 | A1 | 9/2015 | Sherman |
| 2015/0276508 | A1 | 10/2015 | Smullin |
| 2017/0361259 | A1 | 12/2017 | Fox |

FOREIGN PATENT DOCUMENTS

| | | |
|---|---|---|
| CN | 102938023 A | 2/2013 |
| DE | 19905610 | 1/2007 |
| JP | 2008262033 | 10/2008 |
| JP | 2009/174816 A | 8/2009 |
| JP | 2010012463 A | 1/2010 |
| JP | 2010/208466 A | 9/2010 |
| JP | 2013/164191 A | 8/2013 |
| JP | 5258072 | 8/2013 |
| JP | 2013/177997 A | 9/2013 |
| JP | 2013/200098 A | 10/2013 |
| JP | 2014/163532 A | 9/2014 |
| KR | 2010 0129042 A | 12/2010 |
| WO | WO 2007/115224 A2 | 10/2007 |

OTHER PUBLICATIONS

Dias, "Neural Networks Applied to Service Life Prediction of Exterior Painted Surfaces", Building Research & Information, 2014, vol. 42, No. 03, pp. 371-380.

Melhem, "Prediction of Remaining Service Life of Bridge Decks Using Machine Learning", Journal of Computing in Civil Engineering, 2002, vol. 17, No. 1, pp. 1-9.

Pelli, "The Design of a New Letter Chart for Measuring Contrast Sensitivity", Clinical Vision Sciences, 1988, vol. 02, No. 03, pp. 187-199.

(56) References Cited

OTHER PUBLICATIONS

Saha, "Comparison of Prognostic Algorithms for Estimating Remaining Useful Life of Batteries", Transactions of the Institute of Measurement and Control, 2009, vol. 31, No. 3-4, pp. 293-308.
Tudoroiu, "Fault Detection and Diagnosis (FDD) in Heating Ventilation Air Conditioning Using an Interactive Multiple Model Unscented Kalman Filter (IMMAUKF)", Human System Interactions, 2008, pp. 334-339.
International Search Report for PCT International Application No. PCT/US2015/062591, dated Feb. 4, 2016, 3 pages.

* cited by examiner

SYSTEMS AND METHODS FOR PREDICTING HVAC FILTER CHANGE

BACKGROUND

The present disclosure relates to air filters for HVAC systems. More particularly, it relates to systems and methods for predicting the need to change or replace an air filter in an HVAC system, such as in a residential, demand-operation HVAC system.

Heating, ventilation, and air conditioning (HVAC) systems are commonly used to control temperature and air quality in the interior space of various dwellings, such as homes, buildings and other structures. With many HVAC installations, a disposable air filter is conventionally employed. Such filters often include a frame and a fibrous filter material, and may include a reinforcing structure to help support the filter material. After a period of use, these filters become dirty or clogged and must be replaced. Proper filter maintenance helps keep the HVAC system operating at maximum efficiency, reduces operating costs, and better ensures desired indoor air quality; further, continuing to run an HVAC system with an excessively clogged filter can negatively affect the expected useful life of various HVAC system components.

Many non-expert HVAC system users (e.g., homeowners) cannot readily ascertain whether the air filter needs to be replaced by simple inspection and/or do not regularly inspect the air filter. To help such users avoid the problems described above, filter manufacturers recommend replacement on a regular, fixed-interval basis, and in particular a fixed calendar period of time. The fixed interval replacement approach is easy to remember and follow, and the recommended time period is typically based on extensive studies of air filter performance under normal conditions. With this approach, the filter is replaced after a certain recommended fixed calendar period of time, such as three months, has passed. This fixed period of time, however, may not be appropriate for all situations, and in particular with demand-operation HVAC systems (typically employed with residential homes and light commercial dwellings) in which the HVAC system's fan only runs (and thus airflow is presented to the air filter) when the controller is calling for heating or cooling. Under these circumstances, the actual runtime of the HVAC system over the course of the fixed calendar period of time will often vary with the season of the year. As a result, the fixed period may be too short, in which case the air filter is discarded prematurely, or the fixed period may be too long, in which case the air filter is used beyond the time when it should have been changed. Numerous other environmental factors (e.g., airborne particulate levels, user preferences, etc.) may further contribute to deviations between actual filter loading vs. expected at the end of the recommended fixed period of time.

Regardless of whether the recommended fixed period is too short or too long as compared to the actual runtime of the HVAC system, some HVAC system users (e.g., a homeowner) may view the recommended three month (or other) fixed interval filter change as being overly cautious and decide not to follow the recommendation. Others may simply forget to make record of the recommended replacement date. Absent an overt indication that the HVAC system is not operating as expected due to a possibly clogged filter, many users will purposefully or unintentionally not change the air filter until after the air filter is beyond its useful life.

In light of the above, various devices have been devised that indicate a replacement status or need for filter change based on an actual condition of the filter. For example, some filter manufacturers provide color-change indicia or dirty filter pictures/illustrations on the air filter frame and/or packaging to indicate the stage at which the air filter needs to be changed. While these filter change strategies attempt to more closely tie the filter change to actual filter condition, they are not very able to accommodate different kinds of indoor air contaminants that may greatly affect the visual appearance of the air filter. Further, these techniques require the user to remember to visually inspect the air filter in order to determine status.

In other HVAC installations, a digital thermostat is provided, programmed to generate filter change reminders based on actual run hours. The thermostat directly controls the HVAC system and can readily track the number of hours the air filter has processed indoor air; the thermostat's display can indicate to the user when the air filter needs to be changed. Several models of room air cleaners also employ a similar change strategy, using run hours to indicate the need for change. This filter change approach can be a viable option for those users already owning a programmed or programmable digital thermostat. However, the purchase and retro-fit installation to a conventional HVAC system (that does not otherwise include an appropriate digital thermostat) can be expensive and time-consuming.

Another known approach for generating filter status information is premised upon a sensed or monitored pressure drop across the air filter. The pressure drop will increase as the air filter becomes clogged with particles, such that an elevated pressure drop indicates a need to replace the air filter. One such system is provided as after-market product (for installation to an existing HVAC system), and includes a mechanical filter pressure indicator that must be installed between the blower and the filter where a slight vacuum exists and indicates the filter pressure drop to the user. While viable, the user is required to form one or more holes into the HVAC ductwork (e.g., one or more drilled holes) and to perform initial calibration. Due to the numerous variants of HVAC equipment and installation methods, different filters, different airflow in heating and cooling modes, the need for sensor installation, and frequent lack of readily accessible electrical power near the HVAC system, these and other aftermarket indicators are less than optimal.

In light of the above, a need exists for a simple, low-cost system and method of more accurately predicting and communicating the need for filter change in an HVAC system, such as demand-type HVAC system applications.

SUMMARY

Some aspects of the present disclosure relate to computer-implemented methods for estimating or predicting a replacement status of an air filter in an HVAC system, such as an HVAC system operating in a dwelling. The method includes obtaining outdoor weather data for an outdoor environment related to the HVAC system. A Total Runtime Value of a fan of the HVAC system is determined based upon the obtained outdoor weather data. Finally, a replacement status of the air filter is estimated as a function of a comparison of the Total Runtime Value with a Baseline Value. By correlating air filter replacement status with an estimated runtime of the HVAC system fan, more accurate and credible predictors of air filter usage are provided. Moreover, by estimating fan runtime based on easily-obtained outdoor weather data, the methods of the present disclosure are readily implemented with any existing HVAC system and do not require installation of sensors or other mechanical or electrical components to the HVAC system. In some embodiments, the outdoor weather data is electronically obtained from a known weather-related data source (e.g., an online data service such as a website). In yet other embodiments, outdoor temperature and other weather-related parameters are considered as part of the Total Runtime Value determination. In yet other embodiments, the outdoor weather data includes outdoor temperature information and is obtained at regular intervals; a Current Runtime is estimated for each interval based upon the obtained outdoor temperature information. The Baseline Value can be provided in various manners, and in some embodiments is based upon, or adjusted in accordance with, parameters relevant to the particular air filter and/or HVAC system operating conditions, such as dwelling parameters, HVAC use parameters, user preference parameters, and filter parameters.

Other aspects of the present disclosure are directed toward computer-implemented systems for predicting a replacement status of an air filter installed in an HVAC system, capable of implementing the methods described above. In some embodiments, the systems of the present disclosure include a computing device, such as a mobile smart phone, a computer, a computer network, etc., programmed or prompted to perform the methods of the present disclosure.

Yet other aspects of the present disclosure relate to computer-implemented methods for estimating HVAC system air filter replacement status. Outdoor weather data for a geographical region related to the HVAC system is obtained (e.g., electronically retrieved from an online data service). The replacement status of the air filter is approximated using the outdoor weather data. For example, the outdoor weather data is used to estimate air filter runtime, and the air filter runtime is used to estimate the replacement status of the air filter. Related aspects of the present disclosure are directed toward computer-implemented systems with one or more processors configured to obtain the outdoor weather data and to use the obtained weather data to approximate the replacement status of the air filter.

DETAILED DESCRIPTION

Figure 1:
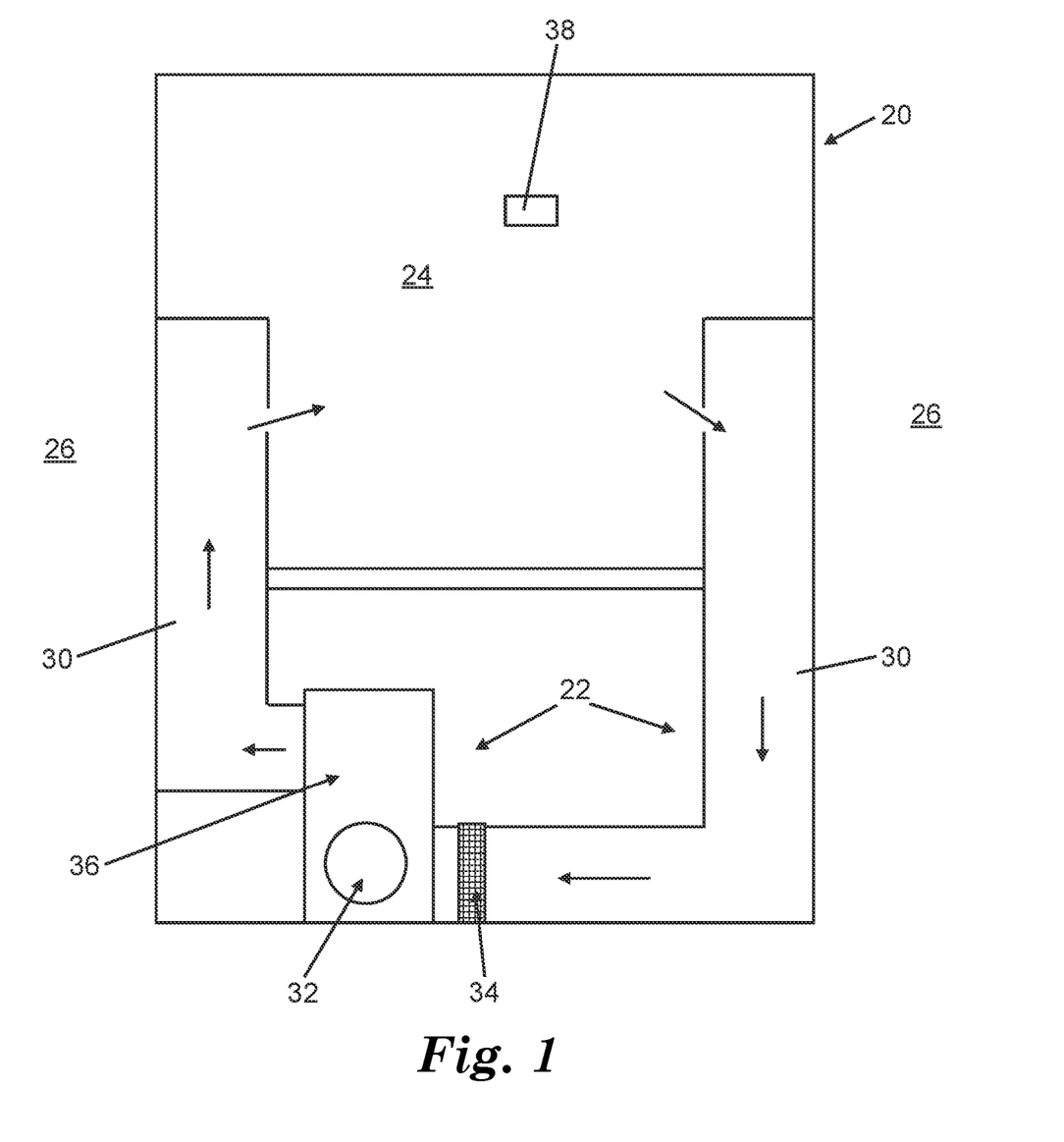
FIG. 1 is a schematic view of an illustrative HVAC system located within a dwelling.

Aspects of the present disclosure relate to systems and methods for estimating or predicting HVAC air filter replacement status and optionally indicating a need for change (or other information) to a user. The systems and methods of the present disclosure can be employed with virtually any type of HVAC installation, but are particularly beneficial with existing, forced air HVAC systems operating on a demand basis (i.e., the systems blower or fan only operates when the system is in cooling or heating mode) such as those commonly found in residential or light commercial dwellings. As a point of reference, FIG. 1 schematically illustrates a dwelling 20 having an installed HVAC system 22 (referenced generally). Conventionally, a structure of the dwelling 20 establishes an interior 24, commonly referred to as "indoor" or "indoor environment", and generally separates or isolates indoor air from an external environment 26 of the dwelling 20 (also referred to as "outdoor" or "outdoor environment"). The term "dwelling" is in reference to any enclosed structure in which one or more persons live, temporarily reside, seek shelter, work, store belongings, etc., such as a house (e.g., single family home, bungalow, duplex, row house, farm house, villa, cabin, etc.), an attached multi-unit housing (e.g., apartment, condominium, townhouse, etc.), a store, an office space, a building, a warehouse, etc. In some embodiments, the dwellings of the present disclosure are in reference to residential homes and light commercial installations as those terms are commonly understood. The HVAC system 22 operates to treat indoor airflow, and includes ductwork 30, a fan or blower 32 and an air filter 34. One or more HVAC components 36 are also provided, and can assume various forms (e.g., furnace, air conditioner, humidifier, etc.). The ductwork 30 (e.g., supply ducts and return ducts) is open to the interior 24 of the dwelling 20, arranged to direct airflow from the interior 24 to the HVAC component(s) 36, and then back to the interior 24 with operation of the fan 32. One or more thermostats 38 or similar controllers dictate operation of the HVAC system 22, such as by activating the fan 32 and the HVAC component(s) 36 in response to various conditions, such as sensed indoor temperature. Regardless, airflow within the HVAC system 22 passes through the air filter 34.

The air filter 34 can assume a variety of forms, and is generally configured to remove dust, debris and other particles (e.g., optionally fine particles having a diameter of 2.5 µm or less ("$PM_{2.5}$")) from the indoor air of the dwelling 20. Over time, as the level of particles captured by the air filter 34 continues to increase, the air filter 34 may detrimentally restrict air flow through the HVAC system 22 and should be replaced. The present disclosure provides systems and methods for predicting the replacement status (or need for replacement) of the air filter 34, and can beneficially be employed with an existing HVAC system. In some embodiments, the systems and methods of the present disclosure operate to provide a meaningful filter replacement prediction without reference to any sensors, or other mechanical or electrical components, connected to the HVAC system 22 or elsewhere inside the dwelling 20.

Figure 2:
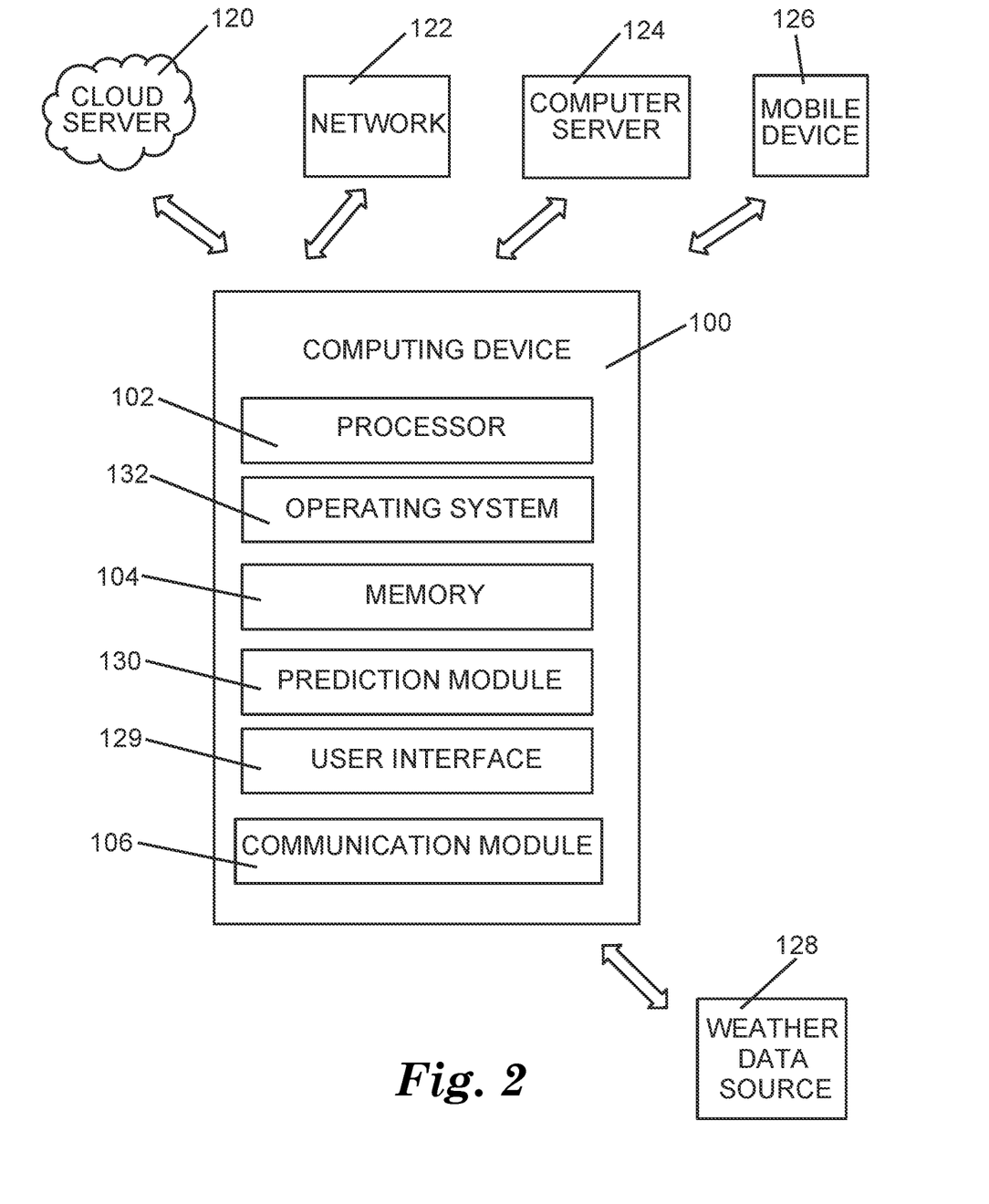
FIG. 2 is a schematic view of a system for estimating a replacement status of an air filter in accordance with principles of the present disclosure.

The systems and methods of the present disclosure can be implemented by one or more computing devices, one non-limiting example of which is shown in block form in FIG. 2 at 100. The computing device 100 can assume various forms known in the art and capable of electronically executing the operations described below. For example, the computing device 100 can be, or can be provided as part of, a mobile device (e.g., mobile smart phone, tablet computer, personal digital assistant (PDA), laptop computer, media player, etc.) or a non-mobile device (desktop computer, computer network server, cloud server, etc.). In more general terms, the computing device 100 includes one or more processors 102 configured to operate according to executable instructions (i.e., program code), a memory 104, and a communications module 106. The processor 102 is electronically connected to the memory 104, and may store information within and subsequently retrieve stored information from the memory 104. The memory 104 can be of a conventional format, such as one or more of random-access memory (RAM), static random-access memory (SRAM), read only memory (ROM), erasable programmable read-only memory (EPROM), flash drive, hard drive, etc. The communications module 106 can include a transmitter and a receiver as are known in the art, and is configured to provide wireless communications with other devices or systems, such as one or more of a cloud server 120, a network 122 (e.g., a public computer network such as the internet), a computer server 124, a mobile device 126, etc., via a communication interface such as, but not limited to, high-frequency radio frequency (RF) signals. As described below, aspects of the present disclosure include electronically retrieving weather data from a weather-related data source or service. The communications module 106 can interface with the weather data source via any of the devices or systems 120-126 or any other appropriate system. FIG. 2 reflects the weather-related data source at 128. The computing device 100 may include additional discrete logic or analog circuitry not shown in FIG. 2. Further, the computing device 100 can optionally include other components and/or modules, such as a user interface module 129 (e.g., a display screen), one or more user input devices (not shown) and associated programming as are known in the art (e.g., touchscreen, keyboard, buttons, mouse, cursor), etc.

With the above basic construction of the computing device 100 in mind, aspects of the present disclosure relate to operational steps provided or embodied by a prediction module 130 included with the computing device 100 and that are described in greater detail below. The prediction module 130 is configured (e.g., executable program code written in any known programming language such as Java, C++, and the like) to provide instructions or algorithms to be executed by the processor 102 as described below. In some embodiments, an operating system 132 executes on the processor 102 and provides an operating environment for the prediction module 130 (e.g., the prediction module 130 can be provided as an "app"). The prediction module 130 can comprise executable program code stored in a computer-readable storage device (e.g., the memory 104) for execution by the processor 102. As other examples, the prediction module 130 can comprise software, firmware or, in some examples, may be implemented in discrete logic. In other examples, the techniques described below may be executed by specifically programmed circuitry of the processor 102.

With additional reference to FIG. 1, the prediction module 130 operates (or causes the computing device 100 to operate) to predict a replacement status of the air filter 34 otherwise installed in the HVAC system 22 as a function of runtime of the fan 32, with this fan runtime, in turn, being estimated based, at least in part, on obtained information indicative of temperature of the outdoor environment 26 ("outdoor temperature"). The term "replacement status" relates to a remaining useful life of the air filter 34. As particles are captured over time, the air filter 34 will increasingly restrict airflow through the HVAC system 22; while the HVAC system 22 can readily operate at an acceptable efficiency level with some elevated airflow restriction at the air filter 34, at some point in time, the restriction to airflow presented by the air filter 34 overly taxes the HVAC system 22. As particles are captured over time, some filters may experience a decrease in filter efficiency. Under either of these circumstances, the air filter 34 is understood as no longer being useful or as having reached the end of its useful life. At the end of the useful life, then, the air filter 34 should be replaced. The "replacement status" as estimated or predicted by the prediction module 130 implicates whether the air filter 34 has reached the end of its useful life (and thus should be replaced) and/or how much of the useful life of the air filter 34 remains (e.g., expressed as a percentage of the useful life).

Figure 3:
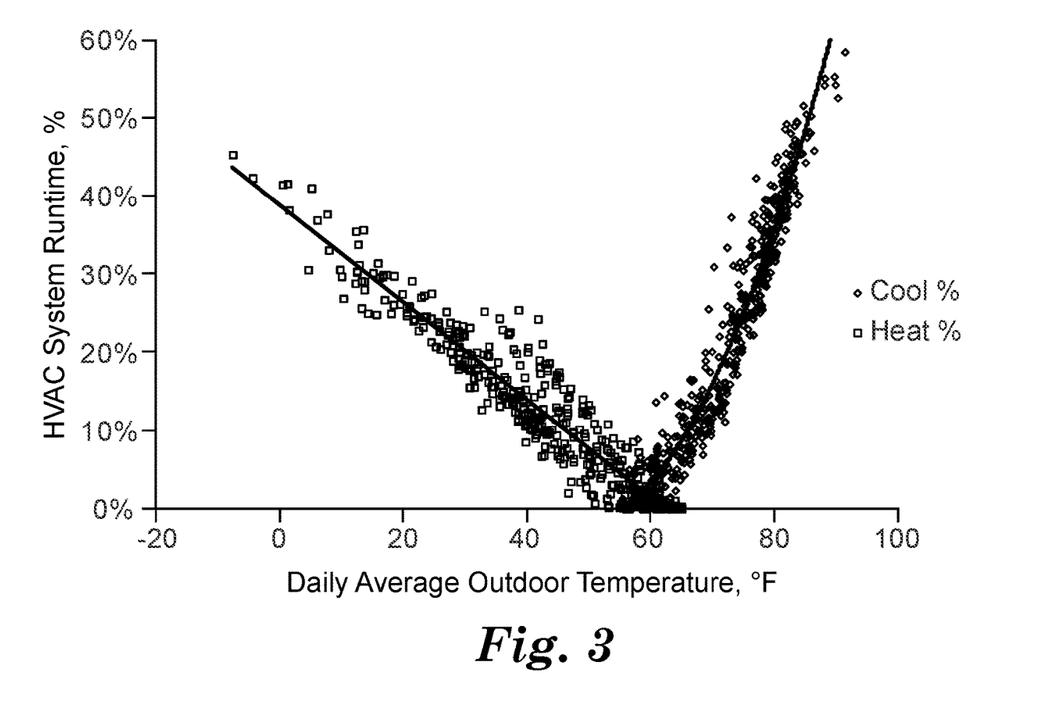
FIG. 3 is a graph illustrating examples of residential HVAC runtime as a function of daily average temperature.

By estimating replacement status as a function of fan runtime, the systems and methods of the present disclosure leverage a correlation between the number of hours the air filter 34 has processed indoor air (and thus fan runtime) and an actual condition of the air filter 34. In other words, the predicted replacement status can be tied to fan runtime with a high degree of confidence. However, the systems and methods of the present disclosure do not require a sensor or other electronic and/or mechanical device connected to the HVAC system 22 for monitoring fan runtime (or any other parameter such as pressure drop across the air filter 34). Instead, the systems and methods of the present disclosure uniquely utilize information relating to or implicating outdoor temperature (and optionally other weather-related and/or non-weather-related information) to estimate fan runtime, with the outdoor temperature information being obtained from a remote source. As a point of reference, it has been surprisingly discovered that a strong correlation exists between fan runtime and the temperature difference inside and outside the dwelling 20 ($\Delta T$)" based on details of FIG. 1. A study was performed on approximately 100 homes in each of the northern and southern climates of the United States to determine the impact of weather variables on residential HVAC runtime when the systems were run in demand (automatic) mode. For both heating and cooling seasons, it was surprisingly discovered that by far the dominant weather effect on fan runtime was $\Delta T$. Also showing some statistical significance in one or both seasons were solar insolation, rainfall, and a wind/temperature interaction (i.e., wind alone was not found to be significant, but cold wind during heating or hot wind during cooling was). FIG. 3 shows the combined summer and winter data where each data point represents a state's average data for one day (four states were included in the study, two each in both the north and the south; due to a very mild winter resulting in a small sample size, the winter data for homes in Florida is excluded). FIG. 3 illustrates a very strong correlation between heating and cooling runtime and the daily outdoor temperature.

Figure 4:
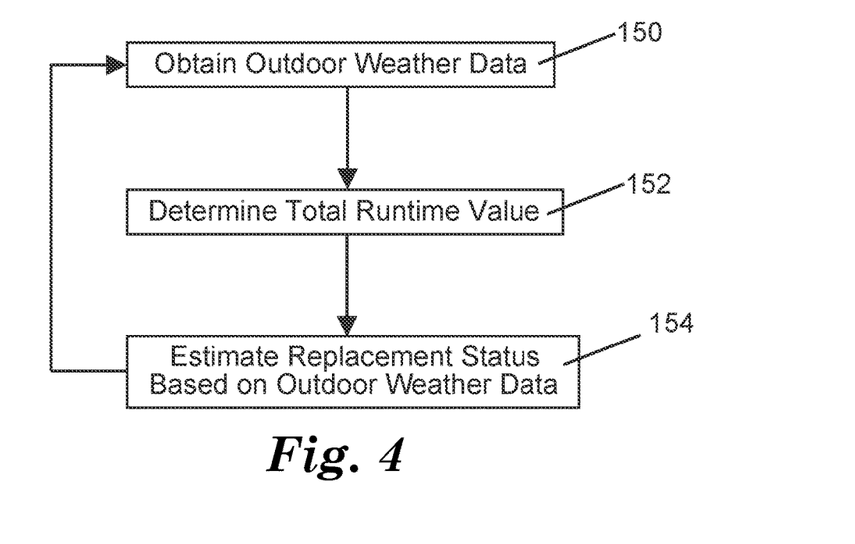
FIG. 4 is a flow chart of a method for estimating a replacement status of an air filter in accordance with principles of the present disclosure.

With the above operational parameters in mind, FIG. 4 is a flow diagram illustrating techniques provided by the prediction module 130 (FIG. 2) and consistent with the present disclosure. In general terms, the techniques entail retrieving or obtaining outdoor weather data (e.g., outdoor temperature information) at 150. The obtained outdoor weather data is used to approximate the replacement status of the air filter 34 (FIG. 1). For example, a Total Runtime Value is determined at 152 based upon the obtained outdoor weather data. The Total Runtime Value relates to or is indicative of a total length of time the fan 32 (FIG. 1) has operated. A replacement status of the air filter 34 (FIG. 1) is estimated at 154 based on the Total Runtime Value (and thus based on the obtained outdoor weather data). In some embodiments, the replacement status is estimated or predicted as a function of the determined Total Runtime Value, such as by comparing the Total Runtime Value with a Baseline Value as described below. The obtained weather data can be stored in raw data form, or optionally can be used to estimate a runtime of the fan over a current time period (to which the obtained weather data applies), with sequential ones of the so-estimated current fan runtimes being correlated with one another (e.g., summed) to determine the Total Runtime Value. In some embodiments, the current fan runtime and/or the Baseline Value can be estimated as a function of, or adjusted in accordance with, information implicating one or more other parameters relevant to the dwelling 20 and/or the HVAC system 22 (in addition to outdoor temperature). The techniques of the present disclosure can be implemented on a loop-type basis, with the Total Runtime Value being recalculated or "updated" each time outdoor weather data is retrieved. The present disclosure is in no way limited to any one particular loop methodology. As such, the filter status prediction techniques of FIG. 4 generally reflect a looped or repeating analysis; non-limiting techniques for accomplishing a loop analysis are provided elsewhere.

Figure 5:
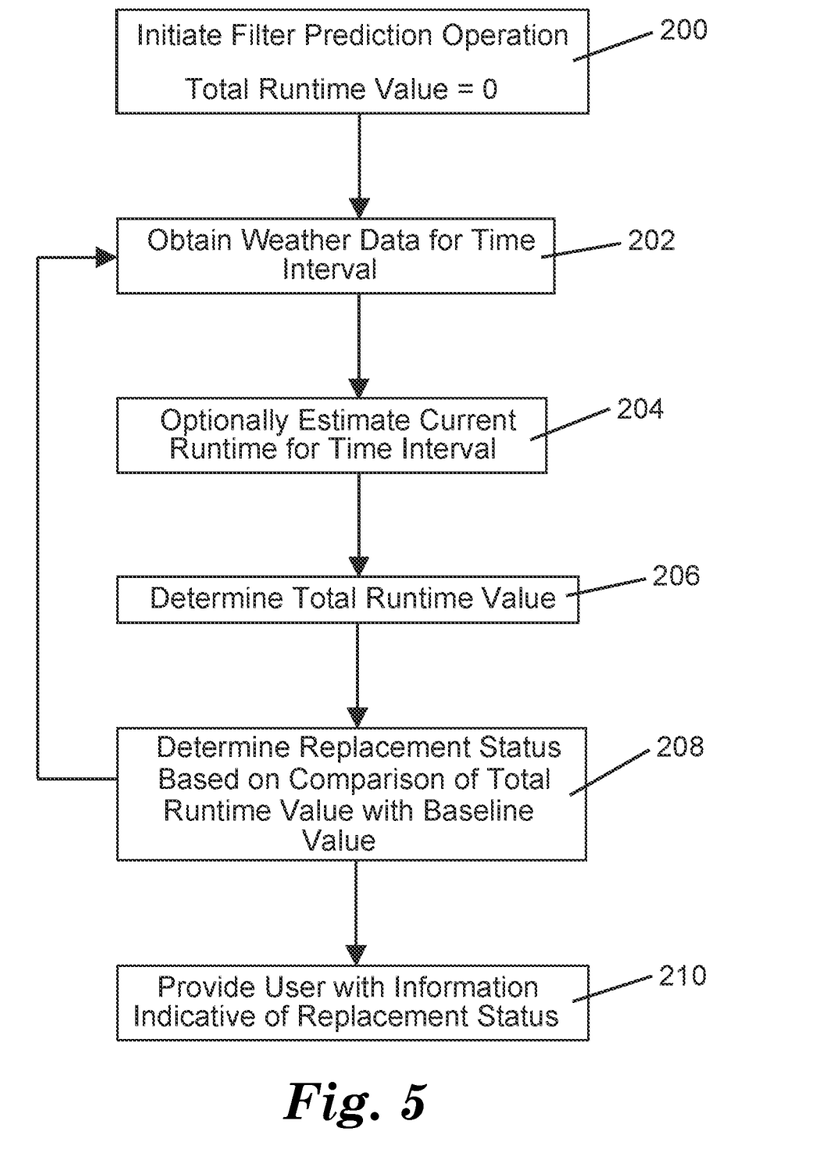
FIG. 5 is a flow chart of another method of estimating a replacement status of an air filter in accordance with principles of the present disclosure.

FIG. 5 is a flow diagram of exemplary methods of the present disclosure. With additional reference to FIGS. 1 and 2, a filter prediction operation is initiated at 200. The prediction module 130 can be configured or programmed to perform prediction functions by establishing and tracking certain values including "Total Runtime". The Total Runtime Value is indicative or representative of the total length of time the fan 32 has been "on" or running with the particular air filter 34 in place. The Total Runtime Value can be expressed as a length of time (e.g., estimated actual runtime of the fan 32 in terms of minutes, hours, etc.). In other embodiments, the Total Runtime Value can represent a variable other than length of time, but that directly correlates with fan runtime. For example and as described in greater detail below, the Total Runtime Value can be based upon unitless heating degree day and/or cooling degree day values that in turn implicate how often the fan 32 is likely to have run. Regardless, at initiation 200 of the filter prediction operation, the Total Runtime Value is set to 0.

Outdoor weather data is obtained at 202. The outdoor weather data provides weather-related information relevant to the outdoor environment 26 of the dwelling 20 (e.g., at a locale or geographical region of the dwelling 20 and thus of the HVAC system 22), and includes at least outdoor temperature information indicative of temperature at the outdoor environment 26 of the dwelling 20 over a designated period of time (or "Time Interval"), for example 24 hours (or one day). Other weather-related information is optionally also obtained as described below. The obtained outdoor temperature information can be an actual outdoor temperature(s) relevant to the outdoor environment 26 over the Time Interval, can be historical outdoor temperature(s) relevant to the outdoor environment 26 over the Time Interval at the same calendar day in a previous year, can be forecasted outdoor temperature(s) relevant to the outdoor environment 26 over the Time Interval, can be heating degree day (HDD) value(s), can be cooling degree day (CDD) value(s), etc. Regardless, the outdoor weather data, and in particular the outdoor temperature information, is obtained by electronically communicating with a data source or provider (e.g., a third party data source) that otherwise records and/or forecasts information indicative of outdoor temperatures (e.g., temperature in degrees, HDD value, CDD value, etc.). For example, the processor 102 can be prompted to operate the communications module 106 to obtain or fetch data from a weather-related online data service (e.g., website) via the internet. The communication interface includes, but is not limited to, any wired or wireless short-range and long-range communication interfaces. The short-range communication interfaces may be, for example, local area network (LAN), interfaces conforming to a known communication standard, such as Bluetooth standard, IEEE 802 standards (e.g., IEEE 802.11), a ZigBee or similar specification, such as those based on the IEEE 802.15.4 standard, or other public or proprietary protocol. The long-range communication interfaces may be, for example, wide area network (WAN), cellular network interfaces, satellite communication interfaces, etc. The communication interface may be either within a private computer network, such as an intranet, or on a public computer network, such as the internet. Other communication interfaces or protocols can include code division multiple access (CDMA), Global System for Mobile Communications (GSM), Enhanced Data GMS Environment (EDGE), High-Speed Downlink Packet Access (HSDPA), a protocol for email, instant messaging (IM) and/or a short message service (SMS).

The obtained outdoor temperature information can be a temperature expressed in conventional terms, such as degrees Fahrenheit or degrees Celsius. In some embodiments, the obtained outdoor temperature information is a single temperature value relevant to the particular Time Interval (e.g., the obtained outdoor temperature information can be an average temperature over the course of the Time Interval, a high temperature of the Time Interval, a low temperature of the Time Interval, etc.). Alternatively, the obtained outdoor temperature information can be a plurality of temperature values relevant to the particular Time Interval. Under these circumstances, the prediction module 130 can be configured or programmed to determine an average temperature from the plurality of temperature values, with the average temperature being utilized with the subsequent analyses described below. Alternatively, the prediction module 130 can be configured or programmed to act upon each of the plurality of temperature values individually (e.g., where the obtained outdoor information associates a time stamp with each temperature value) commensurate with the explanations below. In yet other embodiments, the obtained outdoor temperature information can be or include an HDD or CDD value, or some other parameter, value, etc. other than a temperature (but indicative of or related to temperature).

Where the source of weather-related information is a data service (e.g., website) accessed via the internet, the prediction module 130 can be configured or programmed to "recognize" or fetch desired information from the website using conventional programming logic. For example, the prediction module 130 can be programmed with the format and layout of a known data service (e.g., a weather website) in mind, capable of interrogating and extracting, parsing or fetching the desired data or information from one or more webpages of the designated website (e.g., programmed to extract, parse or fetch data from the Hypertext Markup Language (HTML), Wireless Markup Language (WML), or other language utilized in composing the designated webpage(s) or other online content). The source of weather-related information is not limited to websites, and can be any other format or service. For example, outdoor weather data can be electronically obtained from a personal weather station.

In some embodiments, the source (e.g., a third party source) of weather-related information is specifically directed to only a locale of the dwelling 20 (e.g., the dwelling 20 is located in a particular town or city, and the source of weather-related information is a website dedicated to that same town or city). In other embodiments, the source of weather-related information provides weather data for multiple different locales. Under these circumstances, the prediction module 130 can be configured or programmed to retrieve weather data relevant only to a locale of the dwelling, such as by searching for data applicable to a zip code of the dwelling 20, a name of the city or town in which the dwelling 20 is located, etc. In these and similar embodiments, the systems and methods of the present disclosure optionally provide for the obtaining or retrieval of locale information (e.g., city or town name, zip code, longitude and latitude coordinates, etc.) relevant to the dwelling 20, including receiving locale information from a user (e.g., in response to prompts or inquiries initiated by the prediction module 130), reference to GPS information generated at or delivered to the computing device 100, etc. In some embodiments, the zip code can be obtained by GPS on, for example, a mobile device.

Optionally at 204, a Current Runtime of the fan 32 relevant to the Time Interval is estimated and is or reflects an estimate of the hours or minutes (or other time increment) the fan 32 operated (or was "on") during the Time Interval. The Current Runtime can be estimated based upon at least the obtained outdoor temperature information. In some embodiments, the Current Runtime is estimated based solely upon the obtained outdoor temperature information. In other embodiments, the Current Runtime is estimated based upon the obtained outdoor temperature information along with other factors, such as other information associated with the obtained outdoor weather data, dwelling information, user information, etc., as described below. With respect to the outdoor temperature information component of the Current Runtime estimation, the prediction module 130 is configured or programmed, in some embodiments, to include or derive an algorithm correlating the outdoor temperature information with an expected runtime of the fan 32. For example, the algorithm(s) acted upon by prediction module 130 can be akin to the equations implicated by the data of in FIG. 3. A runtime percentage can be derived from the outdoor temperature information; the Current Runtime is then determined as the product of the runtime percentage and the Time Interval (e.g., if the runtime percentage is determined to be 50% for a Time Interval of 24 hours (or 1440 minutes), the Current Runtime is 12 hours (or 720 minutes)). A number of other algorithms or other techniques for deriving an estimated Current Runtime for the fan 32 based upon at least the obtained outdoor temperature information are envisioned by the present disclosure. For example, the prediction module 130 can be programmed to access or act upon a look-up table that correlates pre-determined Current Runtime values to possible outdoor temperatures. Alternatively, where the outdoor temperature information is an HDD or CDD value, the Current Runtime can be estimated via an algorithm incorporating the HDD or CDD value, or the HDD/CDD value can simply be designated or assigned as the Current Runtime (e.g., the Current Runtime can be the unitless HDD or CDD value). In other words, systems and methods of the present disclosure do not require the step of estimating a Current Runtime from the obtained weather data; instead the obtained outdoor weather data can be stored as a raw number and used to determine the Total Runtime Value as described below. In some embodiments, the algorithm(s) may involve "predicting future HVAC runtime" so as to recommend a date by which the filter is likely to reach is end of life. This can be done, for example, with combination of historical data and user runtime history.

In other embodiments, the prediction module 130 can be configured to incorporate one or more additional variables (in addition to information indicative of outdoor temperature) with the algorithm(s) and/or in selecting a best fit algorithm from a plurality of available algorithms. For example, one or more indoor temperature set points selected by a particular user can affect actual runtime of the fan 32 (e.g., where the outdoor temperature over the Time Interval is 20° F. (heating mode), the fan 32 will run more frequently when the HVAC system indoor temperature set point is 75° F. as compared to an indoor temperature set point of 65° F.). The prediction module 130 can optionally be configured or programmed to account for this user-preference indoor temperature set point factor, for example by being programmed with one or more algorithms that include the indoor temperature set point(s) as a variable, by selecting a particular algorithm that corresponds with the particular indoor set point(s), etc. A single indoor temperature set point can be acted upon, or multiple heating or cooling indoor temperature set points (e.g., daytime and nighttime set points, weekend and weekday set points, etc.) can be accounted for. With these and other embodiments, the prediction module 130 can further be configured or programmed to receive indoor temperature set point information from the user.

Additionally or alternatively, the Current Runtime can be estimated as a function of, or adjusted in accordance with, one or more dwelling-related parameters, examples of which are provided below. In some embodiments, the prediction module 130 is configured to receive information from the user (or other sources such as electronic online data services (e.g., website) as described above) implicating the particular dwelling-related parameter. The so-received information can be employed as a variable in one or more Current Runtime estimation algorithms and/or can be used to adjust a determined, preliminary Current Runtime (e.g., the determined preliminary Current Runtime can be predicated upon an assumed level or value of the particular dwelling-related parameter; where the actual level or value of the dwelling-related parameter varies from the assumed level or value, the determined preliminary Current Runtime can be adjusted accordingly to arrive at the Current Runtime used in subsequent operational steps). Exemplary dwelling-related parameters include, but are not limited to: shading (e.g., where the dwelling 20 is in an heavily shaded environment, an actual runtime of the fan 32 in cooling modes will be less than expected, and in heating modes will be greater than expected); square footage of the dwelling 20 and heating/cooling capacity of the HVAC system 22 (e.g., depending upon the HVAC system capacity, the fan 32 may operate for extended periods of time when installed at a larger dwelling); etc.

Additionally or alternatively, the Current Runtime can be estimated as a function of, or adjusted in accordance with, one or more outdoor weather-related parameters (in addition to temperature). In some embodiments, the information implicating the outdoor weather-related parameter(s) over the Time Interval is included with the outdoor weather data obtained from a weather online data service (e.g., website) as described above. Additional outdoor weather-related parameters include, but are not limited to: precipitation, wind speed, wind direction, solar insolation, humidity, etc.

A new (or current) Total Runtime Value is determined at 206. In basic terms, the determined Total Runtime Value can be the sum or some other correlation of the previous Total Runtime Value and a value implicated by the obtained outdoor weather data, such as the optional Current Runtime.

The Total Runtime Value can be expressed in various terms, such as, but not limited to, minutes, hours, unitless HDD/CDD value, etc. It will be recalled that when the prediction operation is first initiated (at 200), the Total Runtime Value is set to 0. Thus, in some embodiments after the first instance of obtaining outdoor temperature information and the first instance of estimating Current Runtime (or a first Current Runtime), the Total Runtime Value will be the first Current Runtime. Later, a second Current Runtime will be estimated for a subsequent Time Interval, with the Total Runtime Value then being determined as the sum of the first and second Current Runtimes. This cumulative technique continues over time, with each newly-determined Total Runtime Value being acted upon as described below.

At 208, a replacement status of the filter 34 is determined or estimated as a function of at least the Total Runtime Value. The determination can, in some embodiments, be based upon, optionally be based solely upon, a comparison of the Total Runtime Value with a Baseline Value. The Baseline Value is indicative of a useful life of the filter 34, and reflects or represents an estimate of the length of time the filter 34 can be exposed to (or handle) forced airflow and continue to perform at an acceptable level (e.g., is unlikely to have become clogged or dirtied to an unacceptable level that otherwise negatively affects performance of the HVAC system 22). The Baseline Value is expressed in the same units as the Total Runtime Value (e.g., hours, minutes, unitless, etc.), and can be pre-determined, ascertained, or derived by the prediction module 130 in various ways as described below.

In some embodiments, the Baseline Value can be, or can be based upon, a pre-determined number or value that is stored by the prediction module 130. The pre-determined value can be based upon the conventional three month replacement interval recommended for most residential 1" HVAC air filters. It is recognized that HVAC systems will operate more or less frequently in different climates; however, an average yearly operation time for residential demand HVAC systems in the United States can be determined. Assuming the three month recommended replacement interval (or four replacements per year) is applicable to the United States average HVAC operation time, the Baseline Value can be set at one-fourth of the determined yearly average. Other pre-determined Baseline Values are equally acceptable, and can be derived by other strategies.

In other embodiments, the Baseline Value can be determined by the prediction module 130 with reference to one or more algorithms that account for one or more other parameters associated with the particular dwelling 20, the HVAC system 22, user preferences and/or the outdoor environment 26. One or more of these other parameters may be incorporated as a variable in the Baseline Value algorithm, or may be used to adjust a pre-determined starting Baseline Value that is otherwise assigned as above (e.g., based on national average HVAC usages). These other parameters may relate to a likelihood that the particular filter 34 may be exposed or subjected to elevated pollution levels (and thus more quickly become overtly clogged or dirty), user preferences that implicate a desired deviation from a starting Baseline Value otherwise premised on four filter replacements per year, conditions that may implicate the HVAC system operating significantly more or less frequently than an average HVAC system, etc. Information relating to one or more of the other parameters discussed below can be obtained a single time and stored in memory for use with all subsequent filter prediction operations; at the start of a filter prediction operation each time a new air filter is installed; periodically or repeatedly during a prediction operation for a particular air filter (with the Baseline Value being adjusted during the prediction operation); etc.

The Baseline Value can be determined as a function of, or adjusted in accordance with, one or more pollution-related parameters, examples of which are provided below. In some embodiments, the prediction module 130 is configured or programmed to obtain information from the user and/or other sources (such as electronic online data services (e.g., website) as described above) implicating the particular pollution-related parameter. The so-received information can be employed as a variable in one or more Baseline Value determination algorithms and/or can be used to adjust a pre-determined, preliminary Baseline Value (e.g., the pre-determined preliminary Baseline Value can be predicated upon an assumed level or value of the particular pollution-related parameter; where the actual level or value of the pollution-related parameter varies from the assumed level or value, the pre-determined preliminary Baseline Value can be adjusted accordingly to arrive at the Baseline Value used for comparison with the Total Runtime Value). Exemplary pollution-related parameters include, but are not limited to: dust levels in the outdoor environment 26 of the dwelling 20 (e.g., the dwelling 20 is near a dirt road); ground ozone levels at the outdoor environment 26 of the dwelling 20 (particularly relevant where the air filter 34 is configured to capture ozone); fine particle levels ($PM_{2.5}$) in the outdoor environment 26 of the dwelling (particularly relevant where the air filter 34 is configured to capture fine particles); pollen count levels in the outdoor environment 26 of the dwelling 20; presence and number of pets in the indoor environment 24 of the dwelling 20 (e.g., the air filter 34 may more quickly become dirtied with hair, dander, or other particles typically associate with pets and thus has a reduced useful life); number of people normally within the indoor environment 24 of the dwelling 20; window opening habits or preferences of the user (e.g., outdoor air, often laden with airborne contaminants, enters the indoor environment 24 via an open window and the contaminants are ultimately captured at the air filter 34; thus, where a user prefers to keep windows open for extended periods of time, the air filter 34 may become saturated more quickly); an age of the dwelling 20 (e.g., older homes are more susceptible to mold or other contaminants that may become airborne and are then captured by the air filter 34); regular burning of candles within the indoor environment 24 of the dwelling 20; burning of tobacco products within the indoor environment 24 of the dwelling 20; burning of incense within the indoor environment 24 of the dwelling 20; etc.

Alternatively or in addition, the Baseline Value can be determined as a function of, or adjusted in accordance with, one or more HVAC-related parameters, examples of which are provided below. In some embodiments, the prediction module 130 is configured or programmed to obtain information from the user and/or other sources (such as electronic online data services (e.g., website) as described above) implicating the particular HVAC-related parameter. The so-received information can be employed as a variable in one or more Baseline Value determination algorithms and/or can be used to adjust a pre-determined preliminary Baseline Value (e.g., the pre-determined preliminary Baseline Value can be predicated upon an assumed level or value of the particular HVAC-related parameter; where the actual level or value of the HVAC-related parameter varies from the assumed level or value, the pre-determined preliminary Baseline Value can be adjusted accordingly to arrive at the Baseline Value used for comparison with the Total Runtime Value). Exemplary HVAC-related parameters include, but are not limited to: a model or type of the air filter 34 (e.g., the particular air filter 34 may or may not be constructed to capture certain types of contaminants); a dust-holding capacity of the air filter 34; filter change interval recommended by the manufacturer of the air filter 34 (e.g., the manufacturer may recommend filter replacement at an interval differing from the "standard" three-month interval); efficiency of the HVAC system 22 (e.g., cooling efficiency, heating efficiency, or both); capacity of the HVAC system 22 (e.g., cooling capacity, heating capacity, or both); frequency the HVAC system 22 is serviced; an initial pressure drop across the air filter 34; etc.

Alternatively or in addition, the Baseline Value can be determined as a function of, or adjusted in accordance with, one or more user preference-related parameters, examples of which are provided below. In some embodiments, the prediction module 130 is configured or programmed to obtain information from the user and/or other sources (such as electronic online data services (e.g., website) as described above) implicating the particular user preference-related parameter. The so-received information can be employed as a variable in one or more Baseline Value determination algorithms and/or can be used to adjust a pre-determined preliminary Baseline Value (e.g., the pre-determined preliminary Baseline Value can be predicated upon an assumed level or value of the particular user preference-related parameter; where the actual level or value of the user preference-related parameter varies from the assumed level or value, the pre-determined preliminary Baseline Value can be adjusted accordingly to arrive at the Baseline Value used for comparison with the Total Runtime Value). Exemplary user preference-related parameters include, but are not limited to: interest in air quality (e.g., a user expressing a low concern over air quality implicates an increase in the Baseline Value (or less filter changes per year); conversely, a user expressing a heightened or extreme concern over air quality implicates a decrease in the Baseline Value (or more filter changes per year)); user preferred or targeted number of filter changes per year; user fan operation preferences (e.g., user may prefer to run the fan 32 continuously or nearly continuously, regardless of whether the HVAC system 22 is operating to cool or heat air); etc.

The Baseline Value can be determined as a function of, or adjusted in accordance with, one or more other parameters in addition to those discussed above. For example, any of the weather-related parameters mentioned above in the context of estimating Current Runtime may be useful in the Baseline Value determination. Additionally, Current Runtime can be estimated as a function of, or adjusted in accordance with, one or more of the parameters mentioned above in the context of the determining the Baseline Value.

Regardless of how the Baseline Value is determined, comparison of the Total Runtime Value with the Baseline Value at 208 can serve as the basis for characterizing a replacement status of the air filter 34. For example, where the Total Runtime Value is found to approximate, equal, or exceed the Baseline Value, the prediction module 130 can be configured or programmed to determine or designate that the air filter 34 should be replaced. Optionally, the systems and methods of the present disclosure can derive other characterizations of the filter replacement status from the comparison. For example, where the Total Runtime Value is within a predetermined percentage of the Baseline Value (e.g., within 10%), the replacement status can be characterized as the air filter nearing the end of its useful life.

Under circumstances where the determined replacement status does not implicate immediately replacing the air filter 34, or under other circumstances, the methods of the present disclosure can return to 202 at which outdoor temperature information (and optionally additional weather data) is again obtained for a subsequent Time Interval (e.g., daily). The above-described process is repeated, with a new Current Runtime being estimated and added to the Total Runtime Value. The new or updated Total Runtime Value is again compared to the Baseline Value to generate a new or updated replacement status.

In some embodiments, the filter prediction operation for a particular air filter is terminated or ends once the replacement status indicates that the air filter 34 should be replaced. A notification is optionally delivered to the user as described below, and it is assumed the air filter 34 is replaced. In some embodiments, the filter prediction operation is then re-initiated (e.g., automatically or in response to a user prompt) for predicting replacement status of the newly-installed air filter. Alternatively, the prediction module 130 can be configured or programmed to re-initiate the filter prediction operation (including to re-setting the Total Runtime Value to 0) only in response to a prompt or request from the user indicative of a new air filter having been installed. In other words, unless prompted by the user, the prediction module 130 will continue to estimate Current Runtime (optional), Total Runtime Value and replacement status for the not-yet-replaced air filter 34, optionally providing the user with information indicative of the extent to which the air filter 34 is beyond its useful life.

In some embodiments, the systems and methods of the present disclosure further include, at 210, providing (or conveying to) a user with information implicated by the determined replacement status. For example, where the determined replacement status indicates that the air filter 34 should be replaced, the prediction module 130 can operate to prompt sending or providing a corresponding warning or message to the user. Alternatively or in addition, the user can be advised as to a remaining useful life of the air filter 34. The messages, warnings or other information can take various forms. For example, a message or warning can be displayed or generated on the computing device 100. Alternatively, a message can be sent to another device as selected by the user, such as in the form of an email, text or electronic message. Alternatively or additionally, some embodiments relate to a mobile application for, for example, a homeowner where they could receive filter replacement notifications through the application. In some embodiments, the user/homeowner can also indicate to the system when a filter has been replaced (to reset the total runtime).

As mentioned above, systems and methods of the present disclosure can entail reviewing outdoor temperature and other information at regular intervals as part of the Total Runtime Value determination. One non-limiting example of a loop analysis technique is provided in FIG. 6. At 300, the filter prediction operation is initiated. The Total Runtime Value is set to 0. The variable "Start Time" is set to the current date and time (e.g., as entered by the user or as electronically ascertained by the prediction module 130 or other programming associated with the computing device 100).

Figure 6:
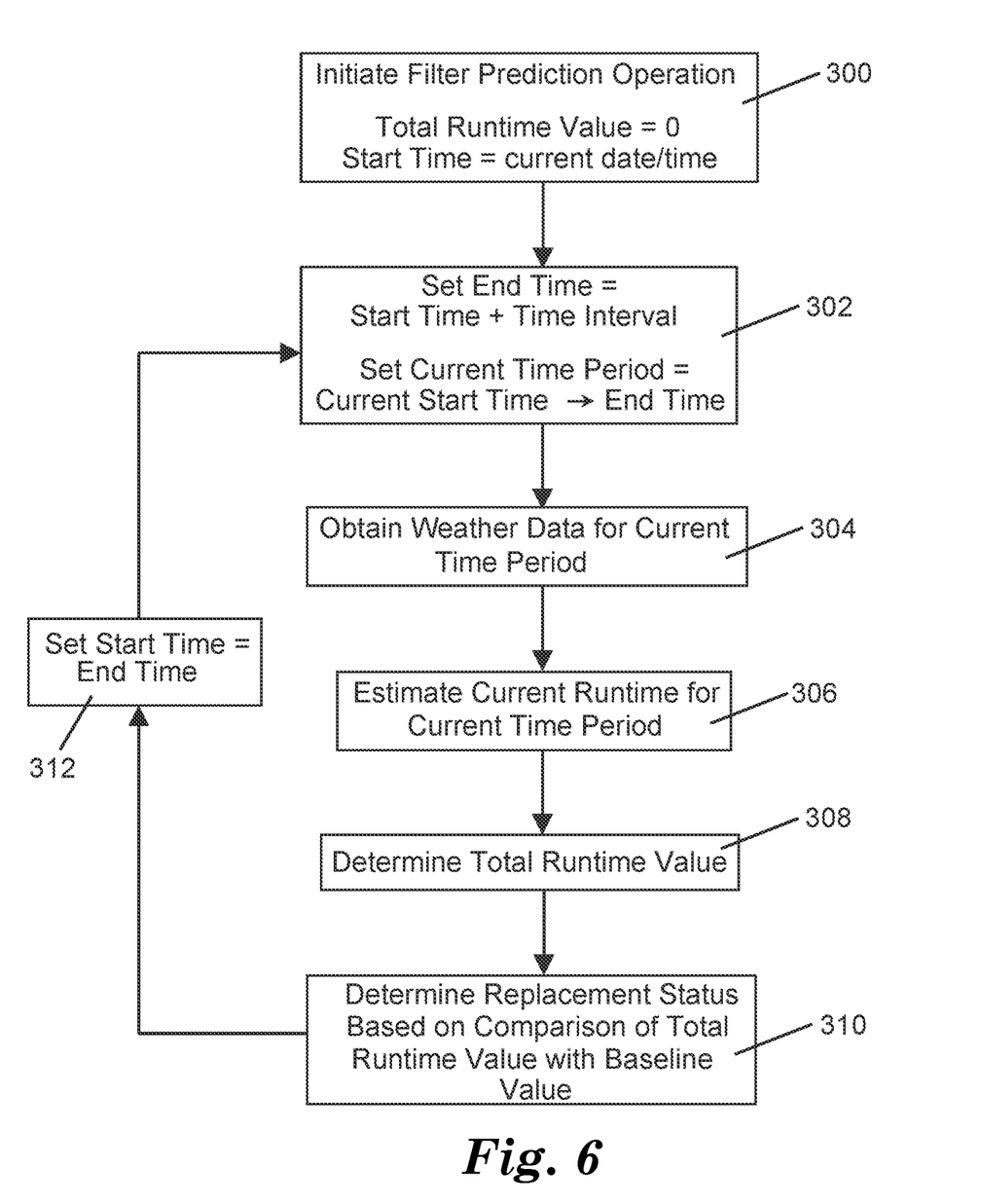
FIG. 6 is a flow chart of another method of estimating a replacement status of an air filter in accordance with principles of the present disclosure.

At 302, the variable End Time is set as the day/time of the sum of Current Start Time and a Time Interval. The Time Interval represents the frequency at which outdoor temperature information (and possibly other outdoor weather data) is retrieved or obtained, and can be expressed in terms of weeks, days, hours, minutes, etc. The Time Interval can be a pre-determined value programmed with the prediction module 130, can be selected by user, can change over time, etc. Also, "Current Time Period" is established as initiating at the Start Time and ending at an End Time. By way of example, if the day/time of the Start Time (as set at 300) is Mar. 1, 2014/5:00 PM and the Time Interval is 24 hours (or daily), the End Time as established at 302 is Mar. 2, 2014/5:00 PM; the Current Time Period is thus Mar. 1, 2014/5:00 PM-Mar. 2, 2014/5:00 PM. In other embodiments where the Time Interval is 24 hours (or daily), only the calendar date need be accounted for (i.e., the time of day does not have to be recorded or tracked).

At 304, outdoor temperature information, and possibly other outdoor weather data, is obtained for the Current Time Period (e.g., following expiration of the End Time), commensurate with the above descriptions. At 306, Current Runtime is optionally estimated for the Current Time Period in accordance with previous descriptions (e.g., as a function of at least the obtained outdoor temperature information). The Total Runtime Value is then set as the sum of Total Runtime Value and Current Runtime at 308. The newly determined Total Runtime Value is used as the basis for determining a replacement status of the filter at 310, such as by comparing the Total Runtime Value with the Baseline Value as described above. Under circumstances where the prediction operation for the air filter will continue (e.g., the estimated replacement status characterized the air filter as having remaining useful life), the Start Time is re-set as the End Time at 312. Continuing the above example, at 312 the Start Time is set to Mar. 2, 2014/5:00 PM. The operation then returns to 302 at which the End Time and the Current Time Period are re-established as described above (i.e., the End Time is determined as the sum of the Start Time and the Time Interval). Continuing the above example (in which the Time Interval is 24 hours), upon returning to 302, the End Time is established as Mar. 3, 2014/5:00 PM, and the Current Time Period is Mar. 2, 2014/5:00 PM-Mar. 3, 2014/5:00 PM.

The techniques embodied by FIG. 6 are but one acceptable approach for loop-type tracking of Total Runtime Value. The systems and methods of the present disclosure can be implemented in a wide variety of other logic scenarios.

In several of the preceding examples, systems and methods of the present disclosure are described as optionally estimating a Current Runtime from the obtained outdoor weather data. In other embodiments, the obtained outdoor weather data embodies an indicator of fan runtime and can be directly added to the Total Runtime Value without modification. In other words, the step of estimating a Current Runtime or otherwise actively designating a Current Runtime from the obtained outdoor weather data is not required by the present disclosure. For example, where the obtained outdoor weather data is an HDD or CDD value (otherwise implicating an outdoor temperature relevant to a geographic region or locale of the dwelling 20 (FIG. 1)), the HDD or CDD value is directly added to the Total Runtime Value.

Figure 7:
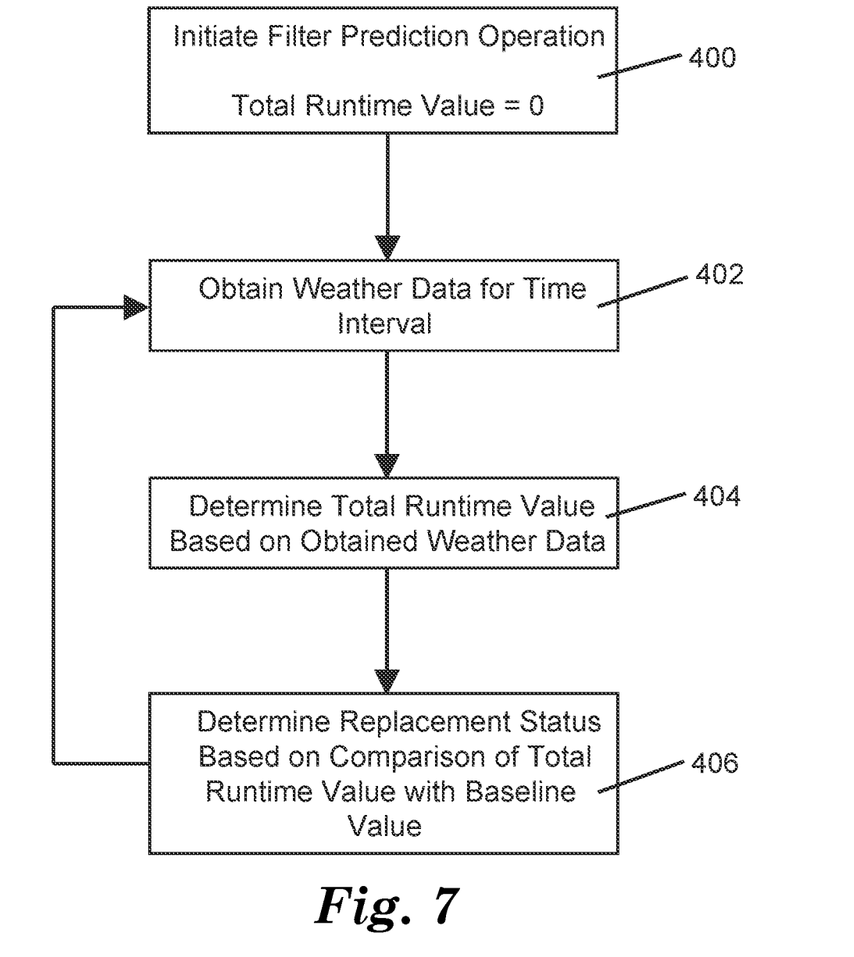
FIG. 7 is a flow chart of another method of estimating a replacement status of an air filter in accordance with principles of the present disclosure.

FIG. 7 is a flow diagram illustrating non-limiting methods of the present disclosure in which Current Runtime need not be estimated. At 400, the filter prediction operation is initiated. The Total Runtime Value is set to 0. At 402, outdoor weather data is obtained for the designated period of time (or Time Interval) commensurate with the above descriptions. With the embodiment of FIG. 7, the obtained outdoor weather data is a value and can be an HDD or CDD value, or can be any other temperature-related value that directly correlates with fan runtime.

At 404, the Total Runtime Value is set as the sum of Total Runtime Value and the obtained outdoor weather value. Thus, with the embodiments of FIG. 7, the Total Runtime Value is not necessarily a length of time, but rather is a value (e.g., a unitless value) that directly correlates with a length of time the fan 32 (FIG. 1) has operated. The newly determined Total Runtime Value is used as the basis for estimating a replacement status of the air filter at 406, such as by comparing the Total Runtime Value with a Baseline Value. The Baseline Value can be predetermined or estimated as described above, and is expressed in terms corresponding with the Total Runtime (e.g., the Total Runtime Value and the Baseline Value can both be expressed as a unitless HDD/CDD number). The steps of obtaining additional weather data and "updating" the Total Runtime Value can subsequently be performed as described above. For example, the techniques of FIG. 7 can operate to obtain an HDD/CDD value each day. The HDD/CDD values are accumulated (as the Total Runtime Value). An end-of-life estimated or predicted filter replacement status can be obtained after the accumulated HDD and/or CDD values reach a baseline.

The systems and methods of the present disclosure optionally calibrate or adjust one or more of the algorithms described above (e.g., algorithms useful in estimating Current Runtime or in determining a Baseline Value) based on feedback information. One of the challenges when developing prediction algorithms is measuring the accuracy of predictions. To measure the accuracy, feedback can be beneficial to gauge the difference between the predictions and the actual parameters. The feedback can be used to tune the algorithm(s) and improve overall accuracy of the system, which, in effect, allows the algorithm(s) to "learn" from past performance. In a laboratory or small user group setting, obtaining accuracy metrics for the algorithm(s) can be accomplished by measuring the state of the air filter at time zero and again at end-of-life as predicted by the algorithm(s), or by measuring the state of the air filter at other points before or after the predicted end-of-life and adjusting the analysis accordingly. These measurements can then help to tune the algorithm(s) as the environment or other dynamic parameters change and must be compensated or accounted for in the algorithm(s). When operating a system deployed to a large number of users, where access to the air filters is not guaranteed, new methods can be identified to gather the feedback information. One method of obtaining this information is through a simple user feedback survey following a filter reminder notice from the filter prediction algorithm(s). In one embodiment, a user will compare the visual appearance of their actual air filter against a known reference scale, the output of which would be a ranking (e.g., number from 1 to 10) associated with the reference most like the appearance of the actual air filter. One example of a reference scale useful with some embodiments of the present disclosure is a Peli-Robson contrast chart. In addition or alternatively, a user could send a digital image of their actual air filter to a party monitoring implementation of the prediction algorithm(s), could ship the air filter to the party, etc.

The systems and methods of the present disclosure provide a marked improvement over previous designs. A simple, low-cost or no-cost means of more accurately predicting and communication the need for filter change in demand HVAC applications (as well as other HVAC application) is provided. The systems and methods of the present disclosure can be implemented without requiring any alterations to an existing HVAC system, such as installation of sensors, mechanical components, or electrical components, and do not require a specialized HVAC system controller. By predicting or estimating a replacement status of the HVAC air filter based on outdoor temperature (and optionally other parameters), users are provided with a credible basis for a filter replacement notification.

Figure 8A:
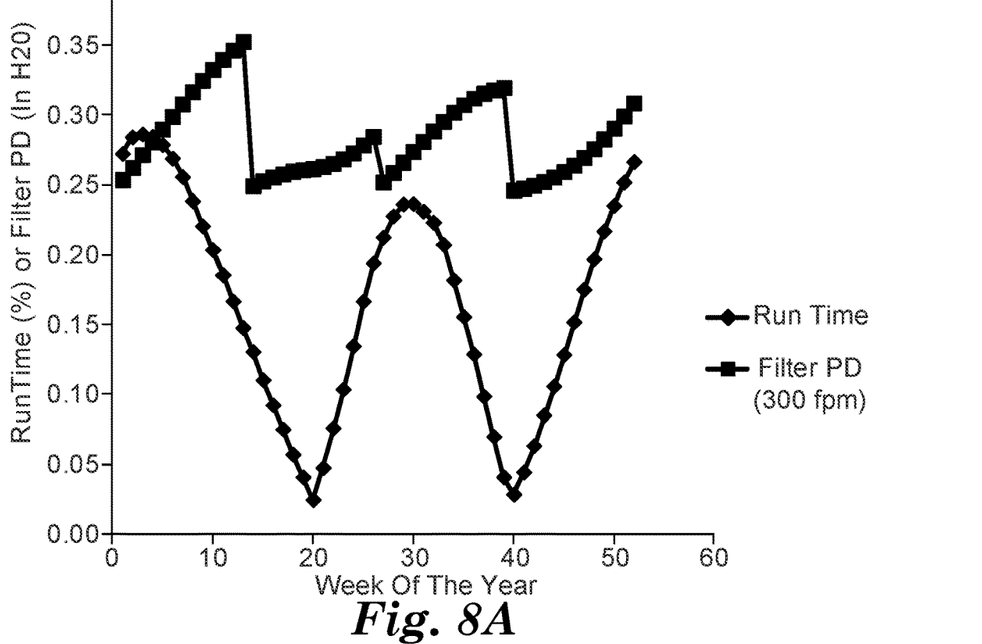
FIGS. 8A and 8B are graphs illustrating a comparison of HVAC air filter performance using calendar-based filter change techniques with optimized filter change techniques in accordance with principles of the present disclosure.
Figure 8B:
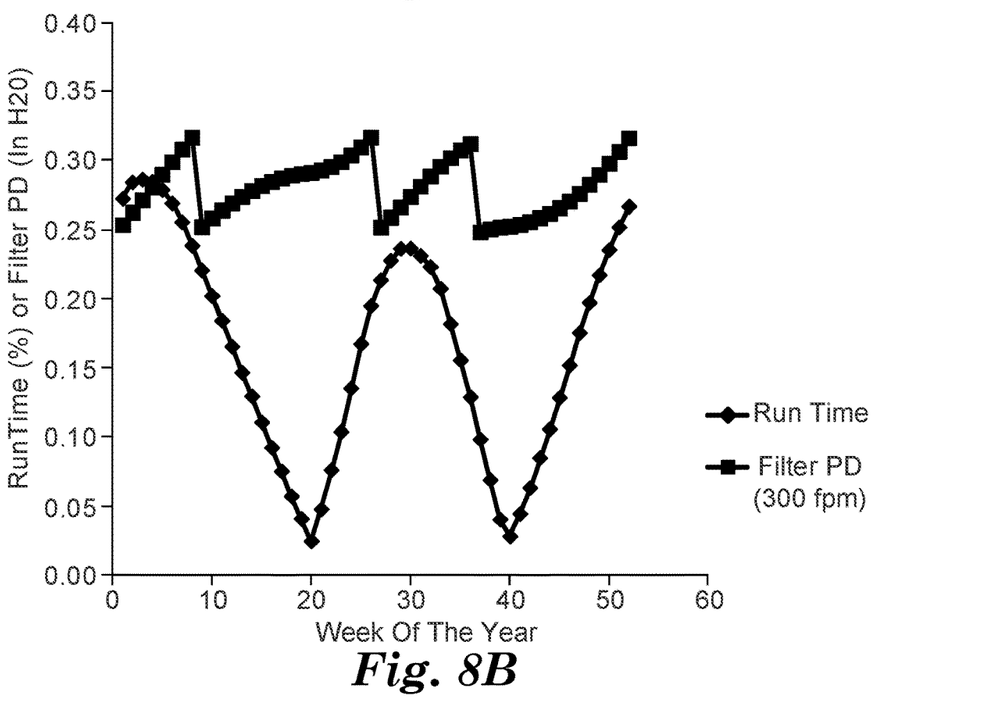

FIGS. 8A and 8B illustrate how the systems and methods of the present disclosure provide improved filter change decisions in comparison to the conventional approach of changing the air filter every three months. The graphs of FIGS. 8A and 8B show predicted HVAC runtime based on published average climate date for the state of Iowa (from the National Oceanic and Atmospheric Administration) and using equations implicated by FIG. 3; both graphs show identical runtime. The second data series in each graph shows the estimated pressure drop of the air filter based on an model correlating runtime, filter dust holding capacity, and filter pressure drop. The graphs of FIGS. 8A and 8B assume a clean filter is installed on January 1, and that four air filters are consumed during the year. The graph of FIG. 8A represents the conventional approach of filter replacement, and assumes that the filter change is even spaced at exactly 13 weeks (3 months). The graph of FIG. 8B reflects the resulting pressure drop when instead changing the air filter at the beginning of weeks 9, 27 and 39 as would otherwise be implicated by the systems and methods of the present disclosure in which air filter replacement is recommended based upon estimated Total Runtime (that in turn is estimated as a function of outdoor temperature).

From an inspection of the two filter change approaches, several items stand out. First, simply changing the air filter ever three months results in a wide range of final filter resistances, ranging from "barely used" to a 40% increase over the starting resistance. The second air filter (of FIG. 8A) in particular shows a low change in pressure drop because it is chiefly used during the transition out of heating mode and into cooling mode when the average runtime is very low. Second, the balanced approach to runtime (of FIG. 8B) not only results in each air filter being used an approximately identical amount, but it also minimizes the maximum pressure drop that the HVAC system experiences, a factor that can be important in maintaining good airflow and equipment health.

Although the present disclosure has been described with reference to preferred embodiments, workers skilled in the art will recognize that changes can be made in form and detail without departing from the spirit and scope of the present disclosure. This application is a continuation of application Ser. No. 17/321,094 (now allowed), which was a continuation of application Ser. No. 16/994,114 (now issued as U.S. Pat. No. 11,040,301), which was a continuation of application Ser. No. 16/790,185 (now issued as U.S. Pat. No. 10,773,200) which was a continuation of application Ser. No. 15/532,186 (now issued as U.S. Pat. No. 10,610,818), which was a national stage filing under 35 U.S.C. 371 of PCT/US2015/062591, which claimed priority to U.S. Provisional Application 62/085,939, the disclosures of all of which are incorporated by reference in their entirety herein.

What is claimed is:

1. A computer-implemented method for estimating a replacement status of an air filter in a heating, ventilation, and air conditioning (HVAC) system, the computer-implemented method executed by one or more processors of one or more computing devices, and comprising the steps of:
obtaining outdoor weather data for an outdoor environment related to the HVAC system, wherein the outdoor weather data includes at least information indicative of a pollution-related parameter at the outdoor environment of a dwelling that comprises the HVAC system;
determining a Total Runtime Value of a fan of the HVAC system based at least in part upon the obtained outdoor weather data; and
estimating the replacement status of the air filter as a function of a comparison of the Total Runtime Value with a Baseline Value, and delivering a notification of the replacement status of the air filter to a user.

2. The computer-implemented method of claim 1, wherein the step of obtaining the outdoor weather data includes electronically accessing an online data service.

3. The computer-implemented method of claim 2, wherein the step of obtaining the outdoor weather data further includes retrieving the outdoor weather data from the online data service.

4. The computer-implemented method of claim 2, wherein the online data service provides the outdoor weather data for a plurality of locales, and wherein the step of obtaining outdoor weather data further includes:
identifying one of the plurality of locales as corresponding with a locale of the HVAC system.

5. The computer-implemented method of claim 4, wherein the step of identifying includes:
comparing a zip code of the HVAC system with a zip code associated with each of the plurality of locales.

6. The computer-implemented method of claim 1, wherein the information indicative of the pollution-related parameter at the outdoor environment of the dwelling that comprises the HVAC system comprises an airborne particulate level.

7. The computer-implemented method of claim 1, wherein the information indicative of the pollution-related parameter at the outdoor environment of the dwelling that comprises the HVAC system comprises a level of airborne fine particles having a diameter of 2.5 µm or less ($PM_{2.5}$).

8. The computer-implemented method of claim 1, wherein the information indicative of the pollution-related parameter at the outdoor environment of the dwelling that comprises the HVAC system comprises a pollen count.

9. The computer-implemented method of claim 1, wherein the dwelling that comprises the HVAC system is a single-family residence, and wherein the HVAC system is a residential, on-demand HVAC system.

10. The computer-implemented method of claim 1, wherein the step of obtaining outdoor weather data further includes obtaining weather information indicative of at least a second weather parameter at the outdoor environment of the dwelling that comprises the HVAC system, apart from the information indicative of the pollution-related parameter at the outdoor environment of the dwelling that comprises the HVAC system.

11. The computer-implemented method of claim 1, further comprising:
determining the Baseline Value as a function of a user preference-related parameter selected from a group consisting of air quality interest level, target number of annual filter changes, fan operation, and window usage.

12. The computer-implemented method of claim 1, wherein the step of obtaining the outdoor weather data is characterized by an absence of directly connecting to a sensor of the HVAC system.

13. A computer-implemented system for estimating a replacement status of an air filter in a heating, ventilation, and air conditioning (HVAC) system, comprising:

one or more processors of one or more computing devices configured to:
  obtain outdoor weather data for an outdoor environment related to the HVAC system, wherein the outdoor weather data includes at least information indicative of a pollution-related parameter at the outdoor environment of a dwelling that comprises the HVAC system;
  determine a Total Runtime Value of a fan of the HVAC system based at least in part upon the obtained outdoor weather data; and
  estimate the replacement status of the air filter as a function of a comparison of the Total Runtime Value with a Baseline Value, and deliver a notification of the replacement status of the air filter to a user.

14. The computer-implemented system of claim 13, wherein the one or more processors are further configured to electronically access an online data service to obtain the outdoor weather data.

15. The computer-implemented system of claim 13, wherein the information indicative of the pollution-related parameter at the outdoor environment of the dwelling that comprises the HVAC system comprises an airborne particulate level.

16. The computer-implemented system of claim 13, wherein the information indicative of the pollution-related parameter at the outdoor environment of the dwelling that comprises the HVAC system comprises a level of airborne fine particles having a diameter of 2.5 μm or less ($PM_{2.5}$).

17. The computer-implemented system of claim 13, wherein the information indicative of the pollution-related parameter at the outdoor environment of the dwelling that comprises the HVAC system comprises a pollen count.

18. A computer-implemented method for estimating a replacement status of an air filter in a heating, ventilation, and air conditioning (HVAC) system, the computer-implemented method executed by one or more processors of one or more computing devices, and comprising the steps of:
  determining a Total Runtime Value of a fan of the HVAC system;
  estimating the replacement status of the air filter as a function of a comparison of the Total Runtime Value with a Baseline Value;
  and,
  delivering a notification of the replacement status of the air filter to a user,
    wherein the Baseline Value is determined as a function of a pollution-related parameter at the outdoor environment of a dwelling that comprises the HVAC system.

19. The computer-implemented method of claim 18, wherein the pollution-related parameter at the outdoor environment of the dwelling that comprises the HVAC system comprises an airborne particulate level.

20. A computer-implemented system for estimating a replacement status of an air filter in a heating, ventilation, and air conditioning (HVAC) system, comprising:
  one or more processors of one or more computing devices configured to:
    determine a Total Runtime Value of a fan of the HVAC system based at least in part upon obtained data;
    estimate the replacement status of the air filter as a function of a comparison of the Total Runtime Value with a Baseline Value; and
    deliver a notification of the replacement status of the air filter to a user,
      wherein the Baseline Value is determined as a function of a pollution-related parameter at the outdoor environment of a dwelling that comprises the HVAC system.

21. The computer-implemented system of claim 20, wherein the pollution-related parameter at the outdoor environment of the dwelling that comprises the HVAC system comprises an airborne particulate level.

* * * * *